Figures 1, 4, 5:
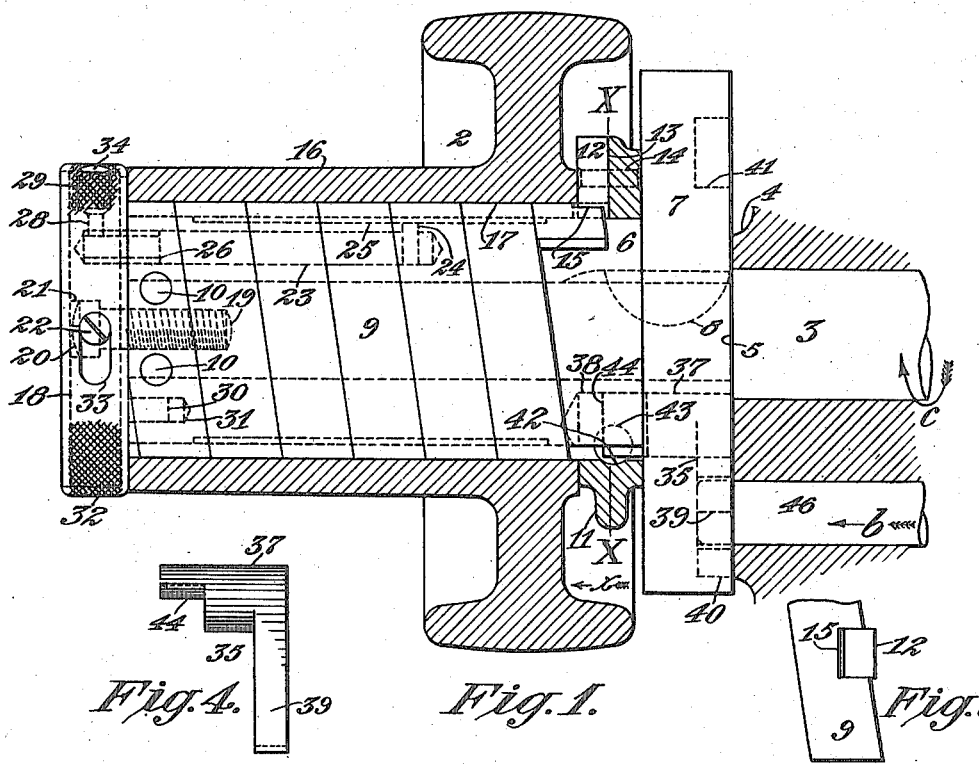

UNITED STATES PATENT OFFICE.

ARTHUR H. MAYNARD, OF WARWICK, RHODE ISLAND, ASSIGNOR TO BOSTON WIRE STITCHER COMPANY, OF PORTLAND, MAINE, A CORPORATION OF MAINE.

FRICTION-CLUTCH.

1,255,547.      Specification of Letters Patent.    Patented Feb. 5, 1918.

Application filed January 31, 1917. Serial No. 145,609.

*To all whom it may concern:*

Be it known that I, ARTHUR H. MAYNARD, a citizen of the United States, residing at Warwick, in the county of Kent, State of Rhode Island, have invented certain new and useful Improvements in Friction-Clutches, of which the following is a specification.

My invention relates to clutch-devices for controlling the rotation of machine elements and consists of improvements in the construction and method of operation of the same. My improved clutch is of the friction type having means engageable to effect a driving action and devices for releasing the engaging-means to arrest the operation of the driven-element. One object of my improvement is to provide means for releasing the driven-element from the driving-element at a predetermined point in its rotation, and to effect a cushioning action on the moving parts as they are brought to rest to prevent strain and shock in overcoming the momentum. My improvement further provides adjustable means for timing the action of the disengaging means and other novel features of construction as more fully explained hereinafter.

The invention is fully described in the following specification, illustrated by the accompanying drawings, in which like reference characters designate like parts. In the drawings:—

Figure 2:
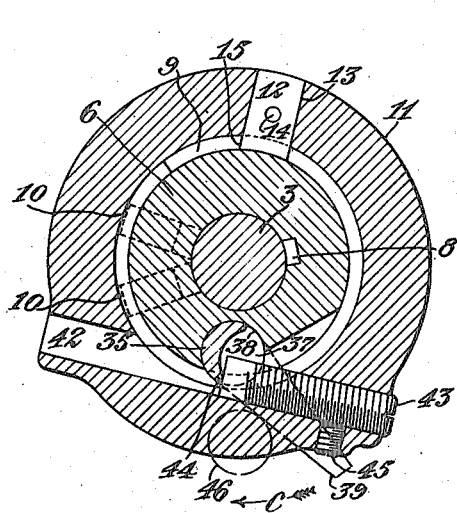
Figure 3:
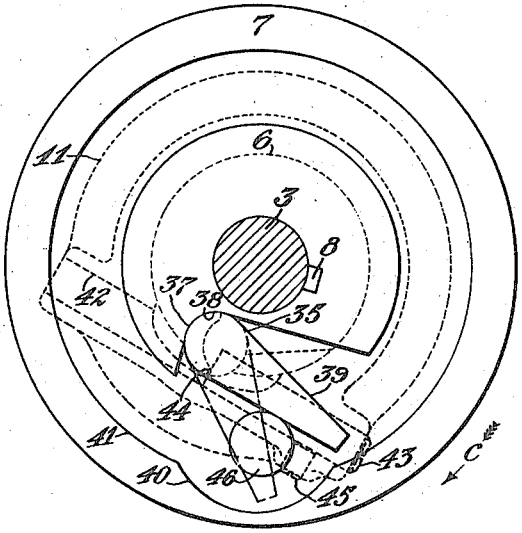

Figure 1 is a longitudinal, sectional view of my improved clutch-device taken on the axis of the shaft on which it is mounted and showing it applied to a driving-pulley from which the shaft is rotated;

Fig. 2, a sectional, detail view of the same taken on the line X—X of Fig. 1, looking in the direction indicated by the arrow *x*, and showing the operating-mechanism for the friction clutch-engaging device;

Fig. 3, an end view of the clutch-operating mechanism looking in the direction indicated by the arrow *x*, Fig. 1;

Fig. 4, a detail view of the clutch-operating pawl; and

Fig. 5, a detail view of the holding arrangement for the friction clutch-engaging element or spring helix.

Referring to Fig. 1, I have herein illustrated my improved clutch-mechanism as applied to a driving pulley 2 for transmitting rotation therefrom to a shaft 3. It is to be understood, however, that my invention is adapted for other uses with different forms of driving- and driven-elements and for various purposes in connection with different types of machinery. As before stated my improvement is particularly designed to regulate the stopping of the driven-element at a predetermined point in its rotation and for this reason is well adapted for use on such apparatus as wire-stitching or stapling machines, sewing-machines, drop-presses or the like. In this class of apparatus it is desirable to arrest the operation of the reciprocating parts of the machine at a certain position in their stroke; for instance, in stapling machines it is required to stop the mechanism with the staple-driver raised above the work. In the same manner it is also preferable to arrest the operation of a drop-press or similar machine with the punch in raised position above the die and my invention is especially adapted for this purpose.

In Fig. 1 the shaft 3 is represented as being journaled in a bearing 4 which may constitute a part of the frame of the machine which it drives or which may be a portion of a hanger or other supporting-bracket. Preferably the portion of the shaft 3 which projects beyond the end of the bearing 4 is reduced in diameter to form a slight shoulder 5. Fitted to this reduced portion of the shaft 3 is a hub or sleeve 6 formed at its right-hand end with a flange or disk 7 one side of which abuts the shoulder 5 and the end of the bearing 4. The sleeve 6 is secured rotatively with the shaft 3 by a key 8 or through any other suitable means.

Surrounding the periphery of the sleeve 6 is a flat, spring coil or band 9, wound helically with its turns in close relation, and secured to the sleeve at its outer end by the pins or rivets 10. Mounted free to turn on the sleeve 6 is a ring or collar 11 abutting the side of the disk 7 and serving as the means for winding up the coil 9. For this purpose the collar 11 is connected to the inner end of the coil 9 by means of a key or dog 12, as illustrated in Figs. 1, 2 and 5. The dog 12 is preferably let into a slot 13 in the side of the collar or ring 11 and held in place by a rivet 14 with its end engaging a slot 15 in the side of the coil 9, see Fig. 5.

The belt-pulley 2, which in the present embodiment of the invention constitutes the driving-element of the clutch, is constructed with a relatively long hub 16 bored to fit over the exterior of the spring-band or coil 9 which surrounds the sleeve 6. The relation between the bore 17 of the pulley 2, the diameter of the sleeve 6, and the radial thickness of the band 9 is such that when the band is coiled tightly around the sleeve a slight clearance is provided so that the pulley will turn freely thereon. When, however, the coil 9 is released its inherent spring tendency will cause it to unwind to a slight extent, thereby expanding its diameter to cause its exterior to bind against the bore of the pulley 2. It will thus be seen that the coil or band 9 acts as the friction-element for engaging the pulley 2 rotatively with the sleeve 6 and the operation of contracting or expanding the coil is controlled through the turning movement of the ring or collar 11 as more fully explained hereinafter.

Secured to the outer end of the shaft 3 is a cap or washer 18 which projects radially beyond the sleeve 6 and abuts the end of the hub 16 of the pulley 2 to maintain the latter in place on its bearing. The cap 18 is fastened in position by a screw 19 screwed into the shaft 3 with its head 20 disposed in a counterbore 21. A set-screw 22 extends radially into the cap 18 with its end bearing against the head of the screw 19 to check the latter against turning after it has been screwed into place to fasten the cap in position. Drilled into the end of the sleeve 6 is an oil-hole 23 having a duct 24 at its end leading to a recess 25 scored on the surface of the sleeve 6. Usually the recess 25 is formed by turning down the diameter of the sleeve 6 between its ends, thereby providing more of a clearance for the contraction of the friction-band 9, besides forming an oil-retaining pocket to insure sufficient lubrication. A small tube 26 is inserted in a hole drilled in the side of the cap 18 and projects into the oil-hole 23 as shown in Fig. 1. Leading into the tube 26 is an oil-hole 28 communicating with a counterbore 29 in the rim of the cap 18. The cap 18 is held from turning by a dowel-pin 30 fitted to a hole 31 in the end of the sleeve 6, and the tube 26 prevents the oil from leaching out between the cap and the end of the pulley hub. To further prevent the escape of the lubricant, and to protect the oil-holes and ducts from the insinuation of dirt, a covering-ring 32 is fitted to the periphery of the cap 18, being held in place by the end of the set-screw 22 which engages a slot 33 in its rim. The ring 32 is preferably knurled or roughened on its surface to facilitate turning it by hand and has an opening 34 adapted to register with the counterbore 29. The slot 33 allows the ring 32 to be turned to bring the openings 34 and 29 into register to receive the oil and the ring is then turned back to cover and protect the oil-ducts.

The means for turning the friction-coil controlling-collar or ring 11 comprises a pawl 35 shown in detail in Fig. 4. The pawl 35 is constructed with a cylindrical hub or bearing 37 which is fitted to turn in a bore 38 extending through the flange or disk 7 on the sleeve 6. The arm 39 of the pawl is located in a recess 40 cut into the side of the disk 7 and this recess is continued in a circular slot 41 extending around its face concentric to the axis of the sleeve 6. The pawl 35 abuts the bottom of the recess 40 and is held in place by the end of the main shaft-bearing 4, the side of the disk 7 being cut away sufficiently to allow for a turning movement of the pawl as indicated in Fig. 3.

Extending tangentially through the coil-operating ring 11 is a hole 42 in one end of which is a screw 43. The end of the screw 43 is adapted to be engaged by a projection 44 on the hub 37 of the pawl 35. As shown in Fig. 2, the end of the hub 37 is cut away to form the crescent-shaped toe or cam-piece 44, the rounded edge of which bears against the screw 43. The screw 43 is adjustable in relation to the pawl 35 and is held in place by a set-screw 45.

The means for operating the pawl 35, to displace the ring 11 to contract the spring 9, consists of a push-rod 46 arranged to slide in parallel relation with the axis of the shaft 3. As shown in Fig. 1 the rod 46 is mounted to slide in a bore in the main shaft-bearing 4, or it might be supported in any other convenient manner. Under normal conditions with the clutch-members in operative engagement the rod 46 is withdrawn away from the side of the disk 7; but when it is desired to release the clutch the rod is slid forward in the direction indicated by the arrow $b$, Fig. 1, to project its end into the slot 41 in the face of the disk. The rod 46 may be operated from a spring, upon the release of a detent, as is usual in various types of machine stop-motions, or it can be moved manually through the medium of a hand- or foot-lever as sometimes employed. When its end is projected into the slot 41 the rotation of the disk 7 will cause it to come into engagement with the side of the pawl 35 to shift the latter to operate the coil-contracting collar 11 as next explained.

The operation of the complete device is as follows: The pulley 2 is driven by a belt, not here shown, from its prime-mover or source of power, and turns in the direction indicated by the arrow $c$, Figs. 1, 2 and 3. With the parts in the relation as shown in Figs. 1 and 2, the spring-coil or friction-band 9 remains released and expanded to grip the bore of the pulley 2 to connect it with the sleeve 6. The sleeve 6 being keyed to the shaft 3, it is obvious that the shaft will be driven from and with the pulley and thus may be made to effect the driving action of the machine or apparatus to which it is connected. Under ordinary loads the spring action of the band 9 will cause a frictional engagement between the pulley 2 and sleeve 6 sufficient to effect a positive drive of the shaft 3, and since the pulley turns in a direction tending to unwind the spring it will have an effect to further increase the expansion and gripping force of the spring so that the drive is equal to practically any load to the capacity of the power applied.

With the spring expanded as above explained the clutch is operative to transmit power from the driving-element or pulley 2 to the driven-element or sleeve 6; or if required, a reversal of the driving operation could be effected by employing the sleeve as the driving-element and the pulley as the driven-element, the direction of rotation then being opposite to that here indicated. With this latter arrangement the position of the pawl 35 would be reversed or, if the same direction of drive were required, then the direction of lead of the spring would be reversed as will be understood from the explanation of the releasing-mechanism to follow.

With the clutch operating as first described, while the pulley 2 turns in the direction indicated by the arrow c in the drawings, when it is required to arrest the rotation of the shaft 3, the slide-rod 46 is moved in the direction indicated by the arrow b, Fig. 1 to enter its end in the groove 41 of the disk 7. Should the rod 46 be shifted at the instant the pawl 35 is passing its end, then the rod will simply ride across the pawl until allowed to project into the slot 41. Now, as the disk 7 continues its rotation the pawl 35 will be brought around into engagement with the rod 46, this action requiring but an instant. In Fig. 2 the dash-lines represent the rod 46 at the instant of its engagement with the side of the pawl 35 and as the connected clutch-members continue to rotate the pawl is turned to the position shown by the full-lines in Fig. 3. As the pawl is shifted in this manner the engagement of its toe or cam-piece 44 with the end of the screw 43 causes a relative displacement between the ring or collar 11 and the sleeve 6. That is to say, the ring 11 which rotates with the sleeve 6 will be retarded in its movement or caused to be shifted rotatively on the sleeve. This relative turning movement of the ring 11 backward on the sleeve 6 causes the spring 9, which is connected to it by the dog 12, to be wound up to contract its diameter. Immediately the spring commences to contract it releases its grip on the bore of the pulley 2 and consequently the pulley will be disengaged from the sleeve 6 to continue its rotation free thereof.

As the pulley 2 is thus freed from the sleeve 6 the latter is brought to rest with a cushioning action effected by the resilience of the spring 9. That is to say, the spring 9 serves not only for the friction-engaging element of the clutch but also as a buffer to absorb the shock and prevent strain in arresting the movement of the driven-element and the parts operated therefrom. This effect is accomplished by the winding up of the spring under the action of its operating-ring 11, due to the turning movement of the pawl 35 as it rides against the rod 46. In brief, the spring 9 acts as a shock-absorber to overcome the momentum of the rotating parts as they are brought to rest.

By adjusting the position of the screw 43 in relation to the hub of the pawl 35 the timing of action of the device may be varied within certain limits. For heavy loads and high speeds the screw is usually set to allow the maximum range of movement of the pawl 35 as illustrated in Fig. 2, so as to obtain the full cushioning effect of the spring 9. For lighter loads and relatively slow speeds the screw may be withdrawn somewhat so as to require less movement of the pawl to displace the spring-operating ring 11. The screw 43 is also employed for adjusting the mechanism for wear. That is to say, after the periphery of the spring or coil 9 and the bore of the pulley become worn to any considerable extent the screw 43 is unscrewed to provide for the proper action of the pawl under the increased expansion of the spring. Without such adjustment, the turning movement of the ring 11 on the sleeve 6 to allow the unwinding of the spring 9 might be restricted by the end of the pawl 35 striking against the edge of the recess 40 in the flange 7.

When it is desired to reconnect the pulley 2 to drive the shaft 3 it is only necessary to withdraw the end of the rod 46 from engagement with the pawl 35. The release of the pawl allows the ring 11 to turn forward, in the direction indicated by the arrow c, Fig. 3, to permit the unwinding and expansion of the spring 9 whereby it engages the bore of the pulley 2. This engagement takes place gradually so that the sleeve 6 starts to rotate slowly at first, but with an accelerated motion as the pulley tends to further unwind the spring and increase its gripping effect on the bore of the hub 16. In this manner the shaft 3 is started to rotate smoothly and evenly without shock or jar in overcoming its inertia or that of the mechanism connected therewith.

I am aware that it is old in the art to employ a coiled spring or helical band as a frictional element to connect two parts of a clutch-device. It is therefore not my intention to claim this feature broadly, but only the present, novel arrangement thereof whereby I secure the improved results as above noted. The principal points of my improvement are: first, the arrangement for utilizing the spring or friction-coil as a shock-absorber in arresting the motion of the driven-element; second, the provision for stopping the driven-element at a predetermined point in its rotation; and third, the means for adjusting the operation of the device for varying loads and to compensate for wear on the engaging surfaces.

Various modifications might be made in the form and arrangement of the parts of the device without departing from the spirit or scope of the invention; therefore, without limiting myself to the exact embodiment herein shown, what I claim is:—

1. In a clutch-device, the combination with a driving-member, of a member adapted to be driven therefrom, a spring-coil for frictionally engaging directly with one member to effect a driving connection with the other member, and means acting against the spring tension of the coil for releasing it from engagement, said means arranged to take the thrust of the driven-member through the coil to absorb the force of momentum as the parts are brought to rest.

2. In a clutch-device, the combination with a driving-member, of a member adapted to be driven therefrom, a spring-coil fastened to one member and arranged to frictionally engage directly with the other member to effect a driving-action therebetween, means to control the spring action of the coil to regulate its engaging effect, and stopping-devices acting on said controlling-means to arrest the operation of the driven-member and arranged to transmit the force of momentum of the going parts against the spring tension of the coil.

3. In a clutch-device, the combination with a driving-member, of a member adapted to be driven therefrom, a spring-coil connected with the driven-member to adapt it to frictionally engage directly with the driving-member, means acting against the tension of the coil to release it from engagement with the driving-member, and means movable into positive engagement with the spring-releasing means to arrest the movement of the driven-member while receiving the thrust in overcoming its momentum through the spring.

4. In a friction-clutch, the combination with a driving-member, of a member adapted to be driven therefrom, a spring-coil for frictionally engaging directly with the driving-member to connect it with the driven-member, means rotatable with the driven-member and adapted to release the coil from driving engagement, and means for positively engaging said releasing-means to arrest its rotation to disengage the coil, said means arranged to act against the spring tension of the coil to absorb the shock in bringing the driven-member to rest.

5. In a friction-clutch, the combination with a driving-member, of a member adapted to be driven therefrom, a spring-coil connected with the driven-member to adapt it to frictionally engage directly with the driving-member, a controlling-member connected with the coil and movable rotatively in respect to the driven-member to release the same, and means for positively engaging said controlling-member to release the coil from engagement with the driving-member while taking the thrust of the driven-member through the coil to arrest its motion without shock or strain.

6. In a friction-clutch, the combination with a driving-member, of a member adapted to be driven therefrom, a spring-coil connected at one end to the driven-member to adapt it to expand to frictionally engage the bore of the driving-member, a collar connected with the opposite end of the coil and rotatable with respect to the driven-member to contract the coil, controlling-means for displacing the coil-contracting collar on the driven-member, and means movable into the path of said controlling-means to shift the collar to release the coil from driving engagement while causing the coil to take the thrust of the driven-element as the latter is brought to rest.

7. In a friction-clutch the combination with a rotatable element formed with a sleeve, of a helical spring surrounding the sleeve and secured thereto at one end, a driving-element having a bore fitted to receive the spring to be frictionally engaged by the peripheral surface thereof, a collar connected to the free end of the spring and rotatable with respect to the sleeve to contract the spring to release it from engagement with the driving-element, and means for effecting a relative displacement of the collar rotatively of the sleeve to release the spring whereby the driven-element is brought to rest with the spring acting as a shock-absorber to overcome its momentum.

8. In a friction-clutch, the combination with a clutch-member having a cylindrical sleeve, of a coiled spring surrounding said sleeve and fixedly secured thereto at one end, a controlling-collar connected to the free end of the spring and rotatably mounted on the sleeve, a second clutch-member fitted to rotate on the periphery of the spring and adapted to be frictionally engaged by the peripheral surface thereof, means for causing a relative displacement of the spring-controlling collar rotatively of the sleeve to wind up the spring, and manually controlled means for operating said means.

9. In a friction-clutch, the combination with a clutch-member formed with a cylindrical sleeve, of a helical spring surrounding the periphery of the sleeve and secured thereto at one end, a second clutch-member having a bore fitted to the periphery of the spring to adapt it to be frictionally engaged thereby, a controlling-collar rotatably mounted on the sleeve and secured to the free end of the spring to effect its contraction, means on the sleeve engageable with the controlling-collar to effect a displacement of the latter rotatively of the sleeve, and means shiftable into engagement with said last named means.

10. In a friction-clutch, the combination with a clutch-member formed with a cylindrical hub, of a helical spring coiled around the hub and fastened thereto at one end, a second clutch-member mounted to rotate free on the periphery of the spring with its bore adapted to be frictionally engaged by the expansion thereof, a pawl carried in a bearing on the hub of the first member and connected to the free end of the spring to wind it up to contract its diameter, and means movable into the path of the pawl during its rotation with the clutch-member.

11. In a friction-clutch, the combination with a clutch-member having a cylindrical hub, of a helical spring coiled around the periphery of the hub and secured thereto at one end, a second clutch-member having a bore fitted to receive the spring to adapt it to be frictionally engaged by the expansion thereof, a collar rotatable on the hub of the first member and fastened to the free end of the spring, a pawl journaled in a bearing on the hub and arranged to displace the collar rotatively to wind up the spring, and means shiftable into the path of the pawl to cause it to actuate the collar in the manner and for the purpose substantially as described.

12. In a friction-clutch, the combination with a clutch-member having a cylindrical hub with a flange at one end, of a spring coiled around the hub and secured thereto at one end, a second clutch-member having a bore fitted to the periphery of the spring to adapt its interior to be frictionally engaged thereby when the spring is expanded, a collar mounted free to turn on the hub of the first member and connected to the free end of the spring to contract its diameter, a pawl journaled in a bearing in the flange and engaging the collar to turn the latter on the hub, and means shiftable into position to engage the side of the pawl to shift the latter to operate the spring-controlling collar in the manner and for the purpose substantially as described.

13. In a friction-clutch, the combination with a clutch-member formed with a cylindrical hub, of a spring coiled around the periphery of the hub and secured thereto at one end, a second clutch-member having a bore fitted to the periphery of the spring to adapt it to be frictionally engaged thereby when the spring is expanded, a collar rotatable on the hub of the first member and connected to the free end of the spring to contract its diameter, a pawl journaled in a bearing on the first member and formed with a projection on its hub, an adjustable screw in the spring-collar adapted to be engaged by the projection on the pawl to turn the collar, and means engageable with the pawl to operate the collar to contract the spring.

14. In a clutch-device, the combination with a member formed with a cylindrical hub, of a spring coiled around the hub and secured thereto at one end, a second clutch-member having a hub bored to receive the spring to be frictionally engaged by its periphery when the spring is expanded, a collar rotatable on the first-member to contract the spring to release it from engagement with the second-member, a pawl on the first-member for rotating the releasing-collar, and means for adjusting the range of movement of the collar under the action of the pawl.

15. In a clutch-device, the combination with a shaft, of a flanged sleeve keyed to said shaft, a helical spring coiled around the periphery of the sleeve and secured thereto at one end, means rotatable on the sleeve to control the expansion and contraction of the spring, a driving-member formed with a hub fitted to the periphery of the spring to adapt it to be frictionally engaged by its periphery when the spring is expanded, a cap secured to the end of the shaft and engaging the end of the sleeve and the hub of the driving-member to retain them in place on their bearings, oil-ducts leading from the cap to the periphery of the sleeve, and a ring rotatable on the periphery of the cap to cover the opening of the oil-ducts.

In testimony whereof I affix my signature.

ARTHUR H. MAYNARD.